(12) United States Patent 
Keum et al.

(10) Patent No.: US 12,609,375 B2 
(45) Date of Patent: Apr. 21, 2026

(54) BATTERY PACK AND VEHICLE COMPRISING SAME

(71) Applicant: LG ENERGY SOLUTION, LTD., Seoul (KR)

(72) Inventors: Jong-Yoon Keum, Daejeon (KR); Bum Choi, Daejeon (KR); Gae-Sung Kim, Daejeon (KR); Dong-Hwan Shin, Daejeon (KR); Soo-Jun Ahn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 613 days.

(21) Appl. No.: 17/928,175

(22) PCT Filed: Feb. 21, 2022

(86) PCT No.: PCT/KR2022/002533 
§ 371 (c)(1), 
(2) Date: Nov. 28, 2022

(87) PCT Pub. No.: WO2022/177395 
PCT Pub. Date: Aug. 25, 2022

(65) Prior Publication Data 
US 2023/0275285 A1 Aug. 31, 2023

(30) Foreign Application Priority Data

Feb. 22, 2021 (KR) ........................ 10-2021-0023550

(51) Int. Cl. 
H01M 10/6557 (2014.01) 
H01M 10/613 (2014.01) 
(Continued)

(52) U.S. Cl. 
CPC ..... H01M 10/6557 (2015.04); H01M 10/613 (2015.04); H01M 10/625 (2015.04); 
(Continued)

(58) Field of Classification Search 
CPC ............ H01M 10/613; H01M 10/625; H01M 10/643; H01M 10/6557; H01M 50/24; H01M 50/242; H01M 50/227 
See application file for complete search history.

(56) References Cited

U.S. PATENT DOCUMENTS

| | | | |
|---|---|---|---|
| 11,088,429 B2 * | 8/2021 | Lee | H01M 50/578 |
| 2011/0090614 A1 * | 4/2011 | Guerin | H01G 2/08 |
| | | | 361/274.3 |

(Continued)

FOREIGN PATENT DOCUMENTS

| | | | | |
|---|---|---|---|---|
| CN | 101151400 A | * | 3/2008 | C02F 1/58 |
| CN | 206685922 U | | 11/2017 | |

(Continued)

OTHER PUBLICATIONS

The extended European Search Report (EESR) dated Nov. 12, 2024, issued in corresponding EP Patent Application No. 22756593.4. (Note: WO 2014/045628 A1, KR 10-2019-0047513 A and JP 2008-251471 A were previously cited).

(Continued)

*Primary Examiner* — Jonathan G Jelsma 
(74) *Attorney, Agent, or Firm* — Morgan, Lewis & Bockius LLP

(57) ABSTRACT

A battery pack according to an embodiment of the present disclosure includes a battery cell assembly including a plurality of battery cells, a coolant filled between the plurality of battery cells of the battery cell assembly, a pack case in which the coolant and the battery cell assembly are accommodated, and a waterproof adhesive provided in the pack case to a certain height and at least partially covering a lower end portion of the battery cell assembly.

20 Claims, 14 Drawing Sheets

10

(51) Int. Cl.

| | |
|---|---|
| *H01M 10/625* | (2014.01) |
| *H01M 10/643* | (2014.01) |
| *H01M 50/145* | (2021.01) |
| *H01M 50/213* | (2021.01) |
| *H01M 50/227* | (2021.01) |
| *H01M 50/24* | (2021.01) |
| *H01M 50/242* | (2021.01) |
| *H01M 50/271* | (2021.01) |
| *H01M 50/505* | (2021.01) |

(52) U.S. Cl.

CPC ....... *H01M 10/643* (2015.04); *H01M 50/145* (2021.01); *H01M 50/213* (2021.01); *H01M 50/227* (2021.01); *H01M 50/24* (2021.01); *H01M 50/242* (2021.01); *H01M 50/271* (2021.01); *H01M 50/505* (2021.01); *H01M 2220/20* (2013.01)

(56) References Cited

U.S. PATENT DOCUMENTS

| | | | |
|---|---|---|---|
| 2015/0188203 | A1 | 7/2015 | Enomoto et al. |
| 2018/0147947 | A1 | 5/2018 | Gebhart |
| 2018/0316070 | A1 | 11/2018 | Lee et al. |
| 2018/0366701 | A1 | 12/2018 | Morimitsu et al. |
| 2019/0074562 | A1 | 3/2019 | Kim et al. |
| 2020/0083575 | A1 | 3/2020 | Yoo et al. |
| 2020/0212386 | A1* | 7/2020 | Jin .................... H01M 10/0463 |

FOREIGN PATENT DOCUMENTS

| | | | |
|---|---|---|---|
| CN | 111725443 | A | 9/2020 |
| EP | 3878683 | B1 | 5/2024 |
| JP | H07-014596 | A | 1/1995 |
| JP | 2006-156171 | A | 6/2006 |
| JP | 2008-251471 | A | 10/2008 |
| JP | 2010-277796 | A | 12/2010 |
| JP | 5978847 | B2 | 8/2016 |
| JP | 2020-79367 | A | 5/2020 |
| KR | 10-2019-0047513 | A | 5/2019 |
| KR | 10-2050025 | B1 | 1/2020 |
| KR | 10-2061745 | B1 | 1/2020 |
| KR | 10-2077165 | B1 | 2/2020 |
| KR | 10-2170242 | B1 | 10/2020 |
| WO | 2014/045628 | A1 | 3/2014 |
| WO | 2017/169728 | A1 | 10/2017 |

OTHER PUBLICATIONS

International Search Report (with partial translation) and Written Opinion dated Jun. 17, 2022, for corresponding International Patent Application No. PCT/KR2022/002533.

Office Action issued Dec. 4, 2023 for Japanese Patent Application No. 2022-573536.

* cited by examiner

FIG. 3

BATTERY PACK AND VEHICLE COMPRISING SAME

TECHNICAL FIELD

The present disclosure relates to a battery pack and a vehicle including the same.

The present application claims priority to Korean Patent Application No. 10-2021-0023550 filed on Feb. 22, 2021 in the Republic of Korea, the disclosures of which are incorporated herein by reference.

BACKGROUND ART

Secondary batteries have high applicability according to product groups and electrical characteristics such as high energy density, and thus, are commonly applied not only to mobile devices but also to electric vehicles (EVs) or hybrid vehicles (HEVs) driven by electric power sources. Because secondary batteries may radically reduce the use of fossil fuel and do not generate any by-products that come with energy consumption, the secondary batteries are gaining attention as a new alternative energy source for improving eco-friendliness and energy efficiency.

Types of secondary batteries that are currently widely used include lithium-ion batteries, lithium polymer batteries, nickel cadmium batteries, nickel hydride batteries, and nickel zinc batteries. An operating voltage of a unit secondary battery cell, that is, a unit battery cell, ranges from about 2.5 V to about 4.5 V. Accordingly, when a higher output voltage is required, a battery pack may be configured by connecting a plurality of battery cells in series. Also, a battery pack may be configured by connecting a plurality of battery cells in parallel according to charge/discharge capacity required for the battery pack. Accordingly, the number of battery cells included in a battery pack may be set in various ways according to a required output voltage or charge/discharge capacity.

When a battery pack is configured by connecting a plurality of battery cells in series/parallel, a method of first configuring a battery module including at least one battery cell and adding other elements by using the at least one battery module to configure a battery pack or a battery rack is general.

In a battery pack of the related art, to further improve the cooling performance of battery cells, a method of implementing a direct water-cooling structure in which cooling water or the like is directly filled in a pack frame in which the battery cells are accommodated is used as a direct water-cooling method.

In the direct water-cooling method, a waterproof structure is particularly important due to characteristics of the direct water-cooling method. In the battery pack of the related art, the waterproof structure is attained by individually press-fitting the battery cells into the pack frame or the like.

However, in the battery pack of the related art, because the battery cells should be individually press-fitted into the pack frame, a work process is complicated, and the risk of leakage increases when the number of battery cells increases.

Hence, there is a demand to provide a battery pack in which a waterproof structure capable of simplifying a waterproofing process is implemented and waterproof reliability is improved, and a vehicle including the battery pack.

DISCLOSURE

Technical Problem

The present disclosure is designed to solve the problems of the related art, and therefore the present disclosure is directed to providing a battery pack in which a waterproof structure capable of simplifying a waterproofing process is implemented and waterproof reliability is improved, and a vehicle including the battery pack.

Technical Solution

In an aspect of the present disclosure, there is provided a battery pack including: a battery cell assembly including a plurality of battery cells; a coolant filled between the plurality of battery cells of the battery cell assembly; a pack case in which the coolant and the battery cell assembly are accommodated; and a waterproof adhesive provided in the pack case to a certain height and at least partially covering a lower end portion of the battery cell assembly.

The battery cell assembly may include: the plurality of battery cells; a first case supporting a side of each of the plurality of battery cells; a cell adhesive provided in the first case and fixing a side of each of the plurality of battery cells; a second case spaced apart by a certain distance from the cell adhesive and supporting the other side of each of the plurality of battery cells; and a bus bar unit provided at the second case and electrically connected to the plurality of battery cells.

The coolant may be filled between the plurality of battery cells in the first case.

The first case may include: a cover frame covering a side of each of the plurality of battery cells; a pair of main supports extending from the cover frame and provided on both outermost sides of the plurality of battery cells; and at least one cell dividing portion provided between the pair of main supports and dividing each of the plurality of battery cells.

The cell adhesive may be filled between the pair of main supports and the at least one cell dividing portion.

The battery cell assembly may further include at least one rigidity reinforcing rib provided in the first case or the second case and extend to a certain length to reinforce rigidity of the battery cell assembly.

Each of the first case and the second case may be formed of a plastic material.

The pack case may include: a base case supporting the battery cell assembly; and a cross beam provided on both sides of the base case and coupled to an upper end portion of the battery cell assembly.

The waterproof adhesive may be filled to a certain height on an inner surface of the base case.

The battery pack may further include a corrosion preventing member provided in the pack case to prevent corrosion of the battery cells of the battery cell assembly.

The corrosion preventing member may include a deoxidizer reacting with oxygen dissolved in the coolant.

The battery cell assembly may further include a middle frame into which the plurality of battery cells are inserted and that is provided to support the plurality of battery cells.

The middle frame may include: a frame body into which the plurality of battery cells are inserted; and a reinforcing rib provided on the frame body and located between the plurality of battery cells.

In another aspect of the present disclosure, there is also provided a vehicle including at least one battery pack according to the above embodiments.

Advantageous Effects

According to the above various embodiments, a battery pack in which a waterproof structure capable of simplifying a waterproofing process is implemented and waterproof reliability is improved and a vehicle including the battery pack may be provided.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 3 is a view for describing a battery cell of the battery cell assembly of FIG. 2.

DETAILED DESCRIPTION

The present disclosure will now be described more fully with reference to the accompanying drawings, in which exemplary embodiments of the present disclosure are shown. These embodiments are provided so that the present disclosure will be thorough and complete, and will fully convey the concept of the present disclosure to one of ordinary skill in the art, and the present disclosure may be embodied in many different forms and should not be construed as being limited to the embodiments set forth herein. In addition, in order to help the understanding of the present disclosure, the accompanying drawings are not drawn to scale, but dimensions of some components may be exaggerated.

Figure 1:
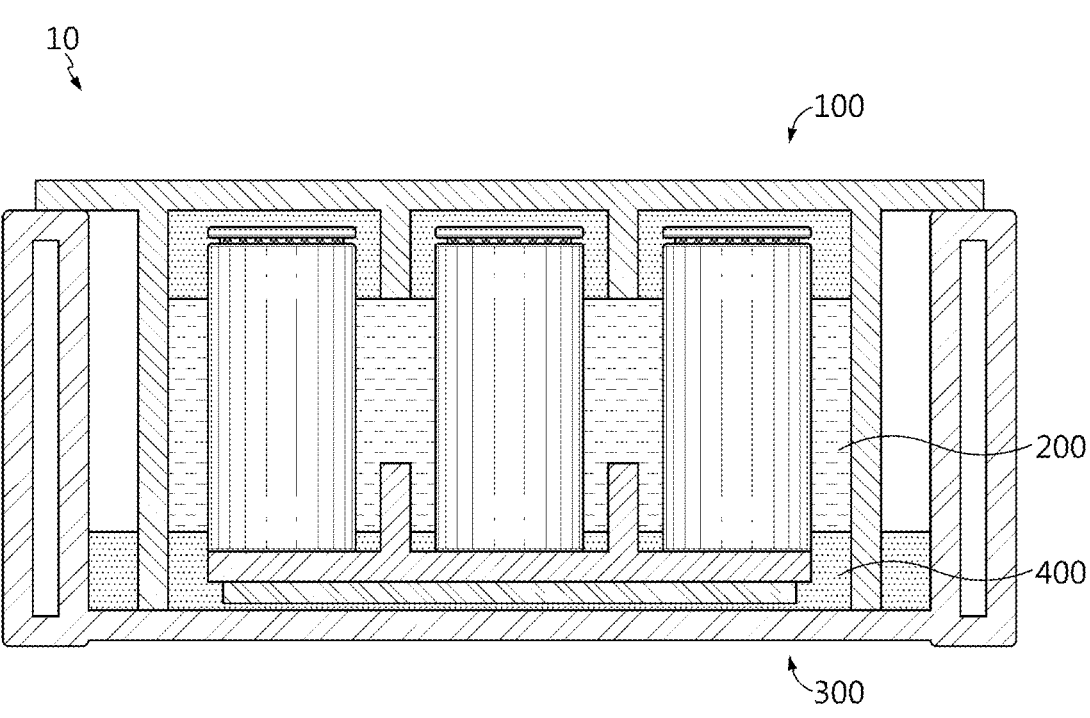
FIG. 1 is a view for describing a battery pack according to an embodiment of the present disclosure.

FIG. 1 is a view for describing a battery pack according to an embodiment of the present disclosure.

Referring to FIG. 1, a battery pack 10 may include a battery cell assembly 100, a coolant 200, a pack case 300, and a waterproof adhesive 400.

The battery cell assembly 100 may include a plurality of battery cells 110. Hereinafter, the battery cell assembly 100 will be described in more detail with reference to related drawings.

Figure 2:
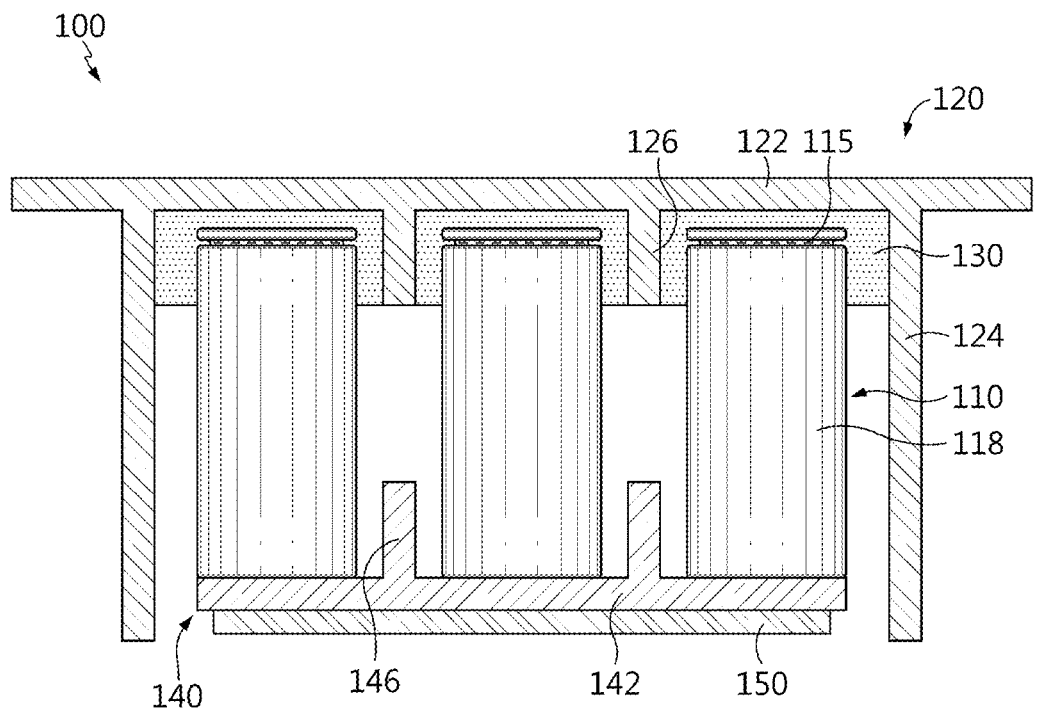
FIG. 2 is a view for describing a battery cell assembly of the battery pack of FIG. 1.
Figure 3:
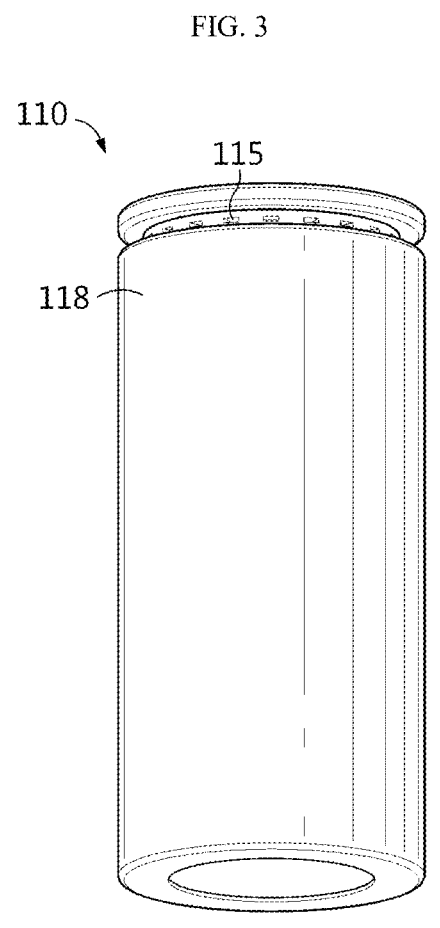

FIG. 2 is a view for describing a battery cell assembly of the battery pack of FIG. 1. FIG. 3 is a view for describing a battery cell of the battery cell assembly of FIG. 2.

Referring to FIGS. 2 and 3 together with FIG. 1, the battery cell assembly 100 may include the plurality of battery cells 110, a first case 120, a cell adhesive 130, a second case 140, and a bus bar unit 150.

The plurality of battery cells 110 that are secondary batteries may be cylindrical secondary batteries, pouch-type secondary batteries, or prismatic secondary batteries. The present embodiment will be described assuming that the plurality of battery cells 110 are cylindrical secondary batteries.

A vent unit 115 through which gas or flame is discharged may be provided on an upper portion of each of the battery cells 110. The vent unit 115 may be formed to have a smaller thickness than that of a peripheral area in the upper portion of the battery cell 110. When an abnormal situation occurs in the battery cell 110 and internal pressure increases to a certain level or higher, the vent unit 115 may break to more easily discharge the gas or flame to the outside of the battery cell 110.

The vent unit 115 may be provided as an opening or a notch having a certain size. In addition, the vent unit 115 may be formed by further adding a film or the like that breaks at a certain pressure or more to the opening having the certain size.

An insulating tube 118 may be provided on an outer circumferential surface of each battery cell 110. The insulating tube 118 for insulating the battery cells 110 may cover outer circumferential surfaces of the battery cells 110. Accordingly, a plurality of insulating tubes 118 may be provided to respectively correspond to the plurality of battery cells 110. The plurality of insulating tubes 118 may be provided as shrinkable tubes.

The first case 120 may support a side of each of the plurality of battery cells 110. In detail, the first case 120 may support an upper side of each of the plurality of battery cells 110.

The first case 120 may be formed of a plastic material. The first case 120 may be coupled to the pack case 300 described below to form a waterproof structure capable of preventing leakage of the coolant 200 described below. The first case 120 and the pack case 300 described below may be adhered to each other through an adhesive or the like to simplify an assembly process.

The first case 120 will be described in more detail.

The first case 120 may include a cover frame 122, a main support 124, and a cell dividing portion 126.

The cover frame 122 may cover a side of each of the plurality of battery cells 110. In detail, the cover frame 122 may cover an upper side of each of the plurality of battery cells 110, to form an upper side of the battery cell assembly 100.

The cover frame 122 may be adhered to a cross beam 330 of the pack case 300 described below through an adhesive or the like. The adhesive may be a thermally conductive adhesive, and may be formed of the same material as that of the waterproof adhesive 400 described below.

A pair of main supports 124 may be provided. The pair of main supports 124 may extend from the cover frame 122, and may be provided on both outermost sides of the plurality of battery cells 110.

The cell dividing portion 126 may protrude by a certain length from the cover frame 122. The cell dividing portion 126 may divide each of the plurality of battery cells 110 in the first case 120, and at least one or more cell dividing portions 126 may be provided. The present embodiment will be described assuming that a plurality of cell dividing portions 126 are provided.

The plurality of cell dividing portions 126 may each protrude by a certain length from the cover frame 122, may be provided between the pair of main supports 124, and may divide the plurality of battery cells 110.

The cell adhesive 130 may be provided in the first case 120, and may fix a side of each of the plurality of battery cells 110. In detail, the cell adhesive 130 may fix an upper side of each of the plurality of battery cells 110.

The cell adhesive 130 may be filled between the pair of main supports 124 and the at least one cell dividing portion 126. The cell adhesive 130 may be a thermally conductive adhesive, and may be formed of the same material as that of the waterproof adhesive 400 described below.

The second case 140 may be spaced apart by a certain distance from the cell adhesive 130, and may support the other side of each of the plurality of battery cells 110. In detail, the second case 140 may support a lower side of each of the plurality of battery cells 110. The second case 140 may be formed of a plastic material, like the first case 120.

The second case 140 will be described in more detail.

The second case 140 may include a seating frame 142 and a cell dividing portion 146.

The seating frame 142 may support the lower side of each of the battery cells 110 and may guide electrical coupling between the bus bar unit 150 and the battery cells 110. The seating frame 142 may include a guide opening for guiding electrical coupling between the battery cells 110 and the bus bar unit 150.

The cell dividing portion 146 may protrude by a certain length from the seating frame 142. The cell dividing portion 146 may divide each of the plurality of battery cells 110 in the second case 140, and at least one or more cell dividing portions 146 may be provided. The present embodiment will be described assuming that a plurality of cell dividing portions 146 are provided.

The bus bar unit 150 may be provided at the second case 140, and may be electrically connected to the plurality of battery cells 110. The bus bar unit 150 may be connected to the plurality of battery cells 110 by using laser welding or wire bonding.

Referring back to FIG. 1, the coolant 200 may be filled between the plurality of battery cells 110 of the battery cell assembly 100. The coolant 200 may be filled between the plurality of battery cells 110 in the first case 120.

The coolant 200 may be cooling water or insulating oil. That is, in the present embodiment, a battery module may be a battery module having a direct water-cooling structure through the coolant 200. The present embodiment will be described assuming that the coolant 200 is cooling water.

The coolant 200 and the battery cell assembly 100 may be accommodated in the pack case 300. To this end, the pack case 300 may include a receiving space in which the battery cell assembly 100 and the coolant 200 may be accommodated.

Figure 4:
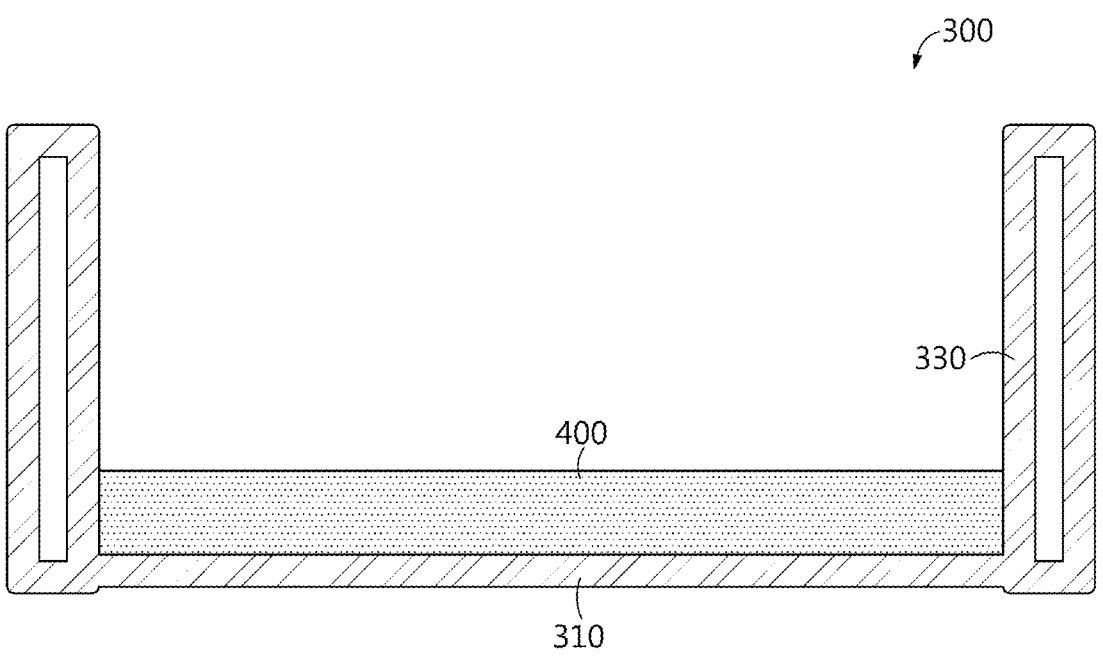
FIG. 4 is a view for describing a pack case of FIG. 1.

FIG. 4 is a view for describing the pack case of FIG. 1.

Referring to FIG. 4 together with FIG. 1, the pack case 300 may include a base case 310 and the cross beam 330.

The base case 310 may support the battery cell assembly 100. To this end, the base case 310 may have a certain area sufficient to support the battery cell assembly 100.

The cross beam 330 may be provided on both sides of the base case 310, and may be coupled to an upper end portion of the battery cell assembly 100. In detail, the cross beam 330 may be coupled to both end portions of the cover frame 122 of the first case 120.

The cross beam 330 may absorb or buffer external impact or the like applied from the outside of the pack case 300 to prevent impact transfer to the battery cells 110 in the pack case 300.

Referring back to FIGS. 1 through 4, the waterproof adhesive 400 may be provided to a certain height in the pack case 300, and may at least partially cover a lower end portion of the battery cell assembly 100.

In detail, the waterproof adhesive 400 may is filled to a certain height on an inner surface of the base case 310. In the waterproof adhesive 400, a lower portion of the battery cells 110 of the battery cell assembly 100, the second case 140, and the bus bar unit 150 may be submerged.

In the present embodiment, through the waterproof adhesive 400, because the battery cell assembly 100 may be fixed in the pack case 300 and the coolant 200 may be sealed in the pack case 300, a waterproofing process may be further simplified, manufacturing costs may be reduced, and waterproof reliability may be improved.

The waterproof adhesive 400 will be described in more detail.

The waterproof adhesive 400 may be a potting resin 400. The potting resin 400 may include a silicone resin or a urethane resin having high cooling and adhesion performance. This is merely an example, and the potting resin 400 may include another resin material such as an acrylic resin or an epoxy resin having high cooling and adhesion performance.

The potting resin 400 may include a phase-change material. This is to further improve the cooling performance of the potting resin 400, and to further reduce thermal energy of the battery cells 110 through phase change. For example, the potting resin 400 may include a paraffin material. Because the paraffin material may undergo phase change at a temperature of 33° C. to 46° C. to absorb heat, the cooling performance of the battery cells 110 may be effectively improved. The paraffin material may be encapsulated by an acrylic coating or the like to further improve the injection performance when the potting resin 400 is injected.

The potting resin 400 may include a flame retardant. The flame retardant that is a ceramic-based flame retardant may be added to the potting resin 400. For example, the flame retardant may be aluminum hydroxide.

Accordingly, because the potting resin 400 is provided as a composite resin including a resin material such as a silicone resin or a urethane resin, a paraffin material that is a phase-change material, and a flame retardant such as aluminum hydroxide, a waterproof function may be achieved, the cooling performance of the battery cells 110 may be significantly improved, and heat transfer to the surroundings when an abnormal situation of the battery cells 110 occurs may be more effectively prevented.

An assembly process of the battery pack 10 according to the present embodiment will be described below in more detail.

FIGS. 5 through 9 are views for describing an assembly process of the battery pack of FIG. 1.

Figure 5:
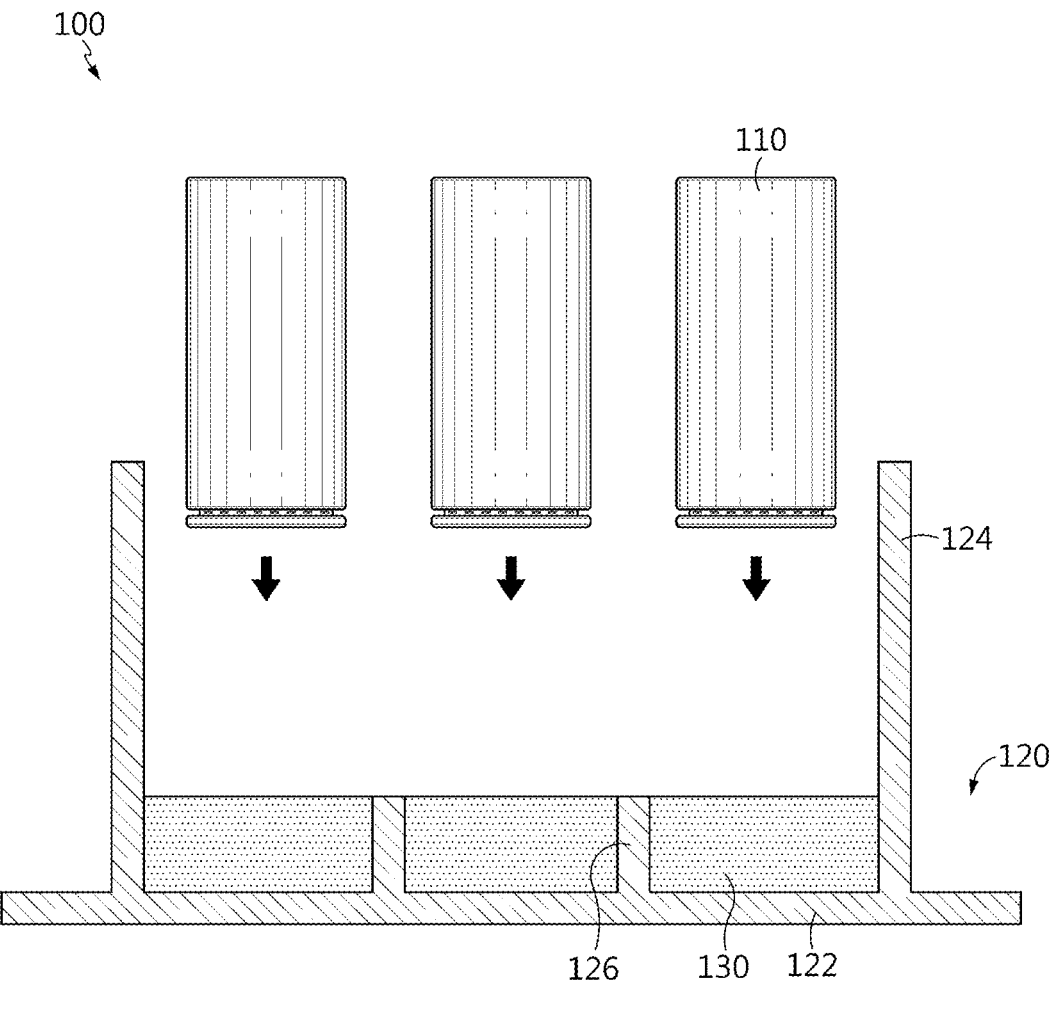
FIGS. 5 through 9 are views for describing an assembly process of the battery pack of FIG. 1.

Referring to FIG. 5, a manufacturer or the like may turn the first case 120 of the battery cell assembly 100 upside down, may fill the cell adhesive 130 to a certain height in the first case 120, and may turn the battery cells 110 between the main supports 124 upside down to be fixedly seated between the cell dividing portions 126.

Figure 6:
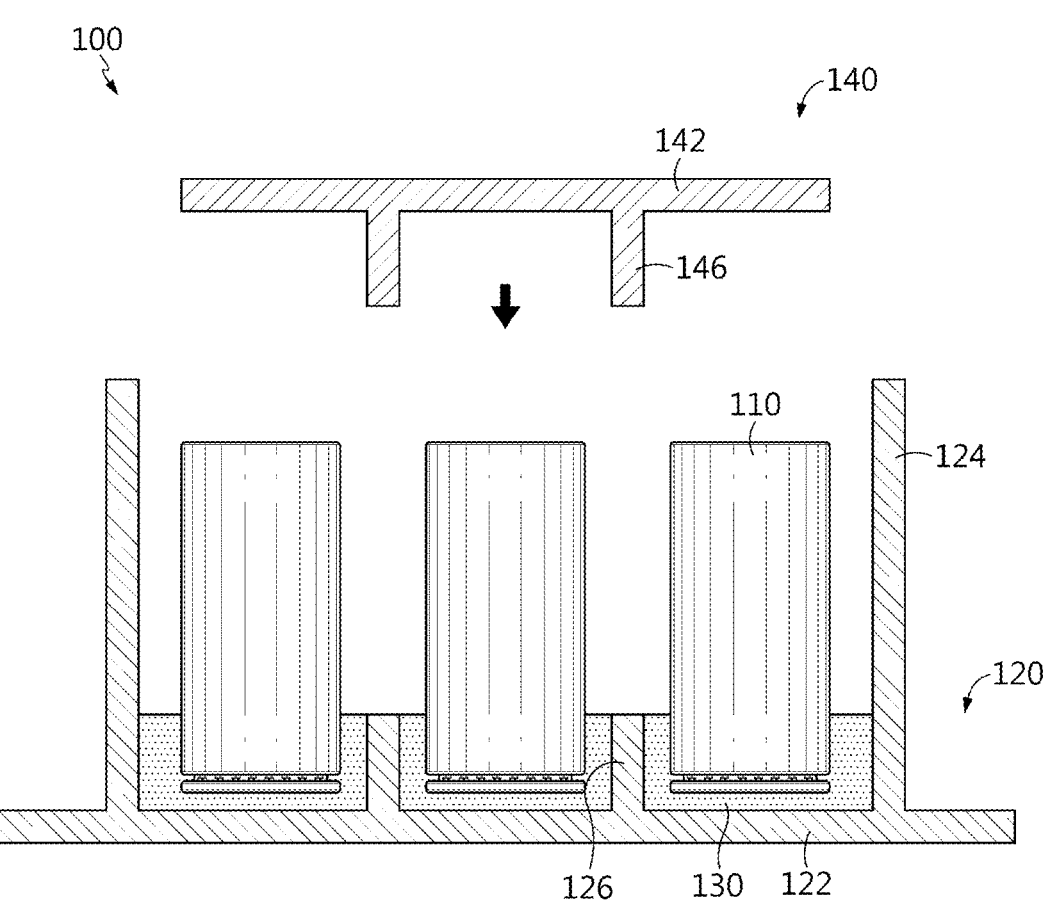
Figure 7:
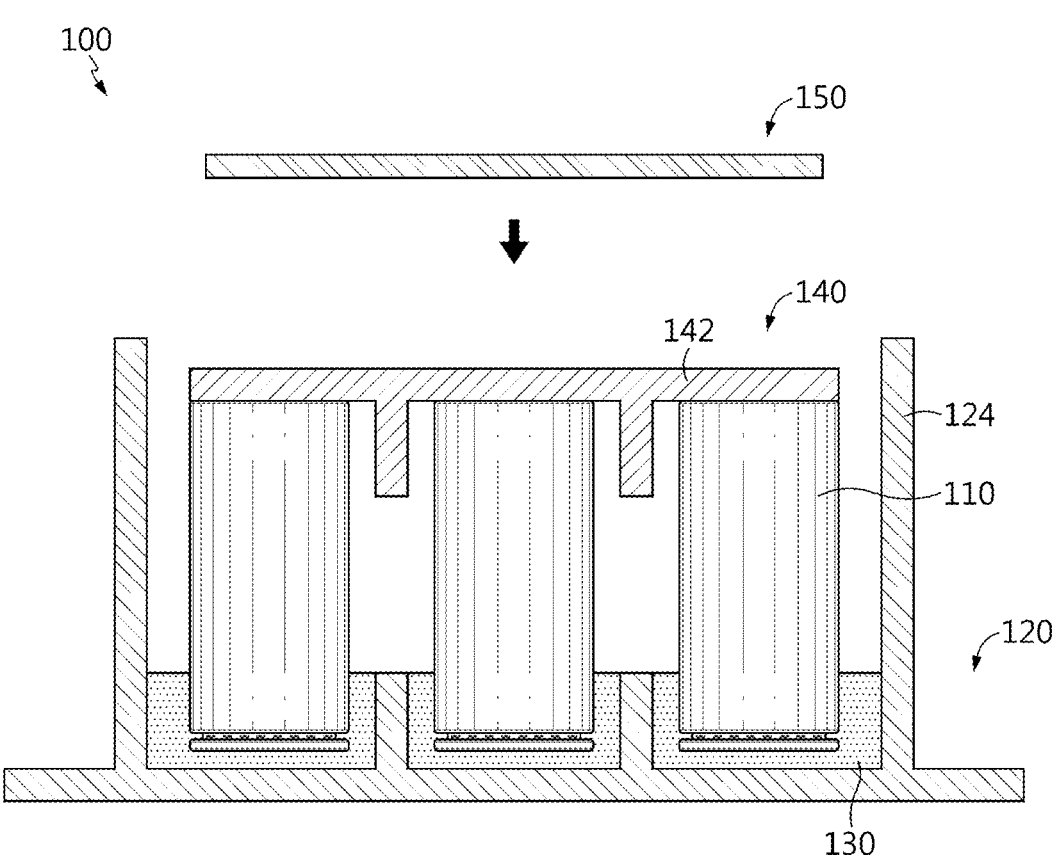
Figure 8:
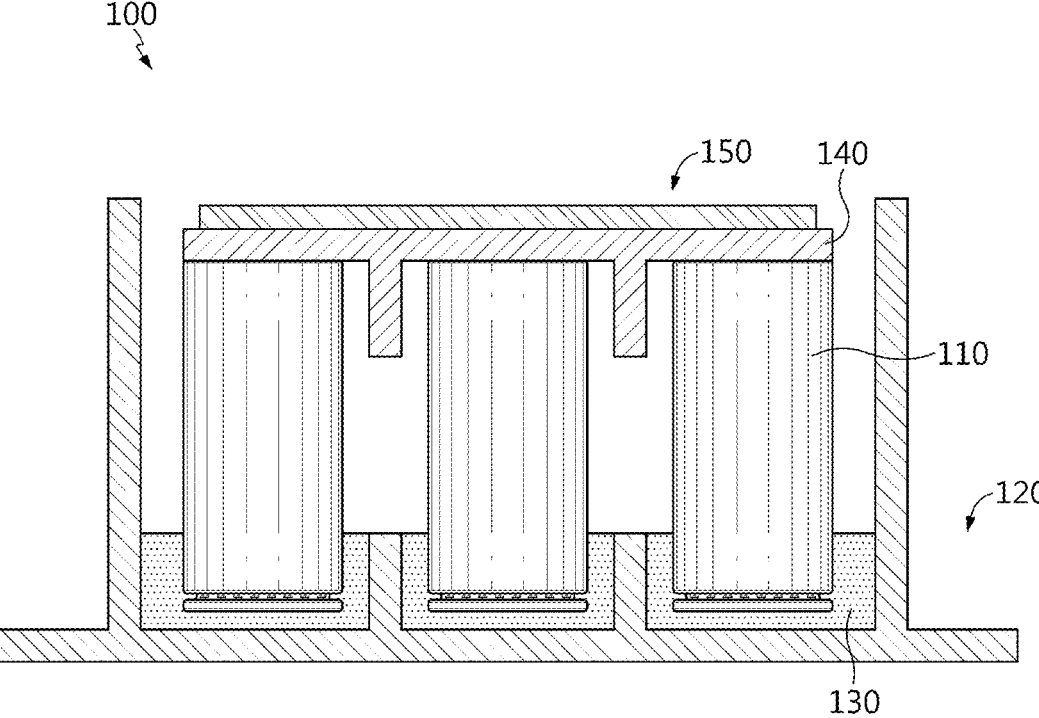

Referring to FIG. 6, next, the manufacturer or the like may seat the second case 140 to cover the battery cells 110. Referring to FIG. 7, next, the manufacturer or the like may seat the bus bar unit 150 on the seating frame 142 of the second frame 140. Referring to FIG. 8, next, the manufacturer or the like may electrically connect the bus bar unit 150 to the battery cells 110 through laser welding or wire bonding.

Figure 9:
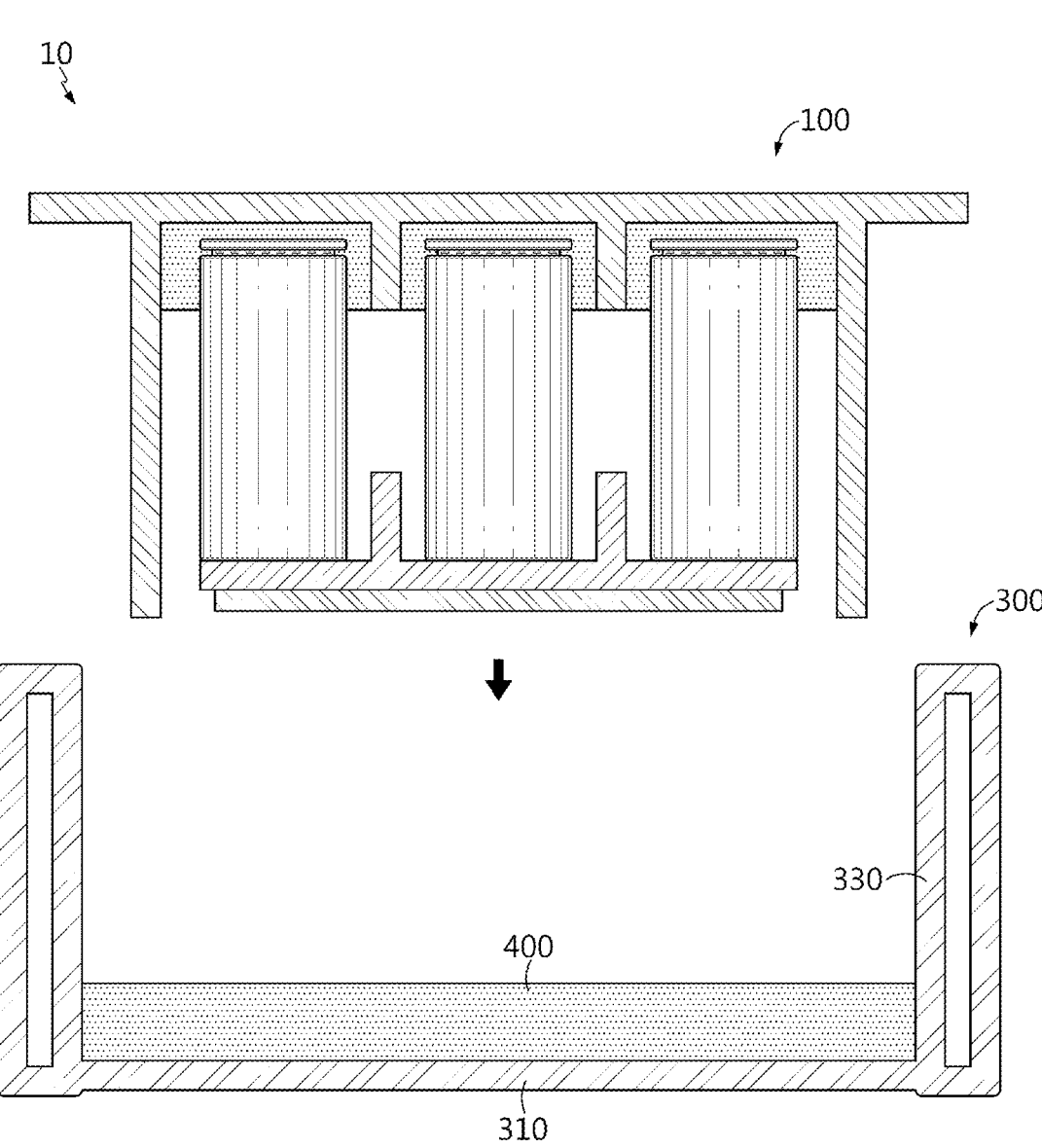

Referring to FIG. 9, next, the manufacturer or the like may turn the battery cell assembly 100 upside down again and then may fixedly insert the battery cell assembly 100 into the pack case 300 in which the waterproof adhesive 400 is filled. Next, the manufacturer or the like may inject the coolant 200 (see FIG. 1) into the battery cell assembly 100. The coolant 200 may be injected through a coolant inlet formed in at least one of the battery cell assembly 100 and the pack case 300. When the injection of the coolant 200 is completed, the manufacturer or the like may seal the coolant inlet.

As such, because the battery pack 10 according to the present embodiment implements a waterproof structure through adhesive bonding using the potting resin, through the first case 120, the cell adhesive 130, the second case 140, and the waterproof adhesive 400, a waterproof assembly process may be further simplified.

Because the battery pack 10 according to the present embodiment implements the waterproof structure through an integrated adhesive bonding structure of the battery cells 110, rather than an individual press-fitting coupling structure of the battery cells 110, through the cell adhesive 130 and the waterproof adhesive 400, the assembly process efficiency may be significantly improved and the risk of leakage may be significantly reduced compared to the individual battery cell coupling structure.

In the battery pack 10 according to the present embodiment, a safety ensuring mechanism when an abnormal situation occurs due to overheating or the like will be described in more detail.

Figure 10:
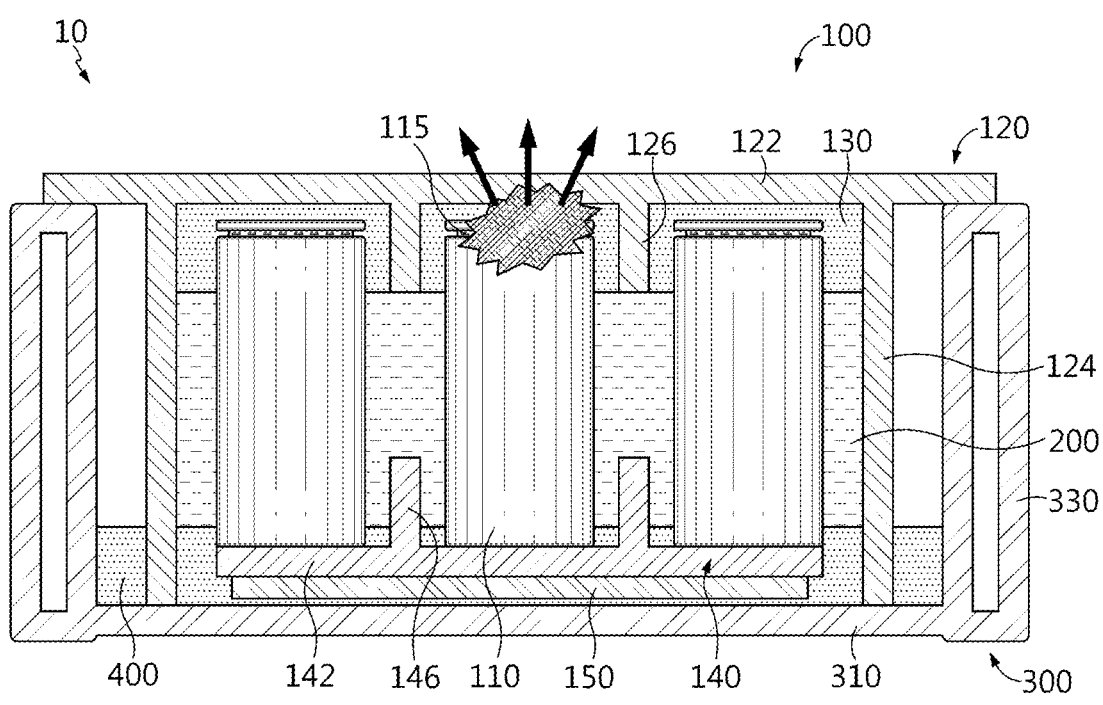
FIG. 10 is a view for describing a safety ensuring mechanism when an abnormal situation occurs in the battery pack of FIG. 1.

FIG. 10 is a view for describing a safety ensuring mechanism when an abnormal situation occurs in the battery pack of FIG. 1.

Referring to FIG. 10, in the battery pack 10, an abnormal situation may occur due to overheating or the like in one battery cell 110 and gas or flame may be generated. In this case, the gas or flame may be quickly discharged through the vent unit 115 of the battery cell 110 in which the abnormal situation occurs.

In addition, in the present embodiment, because the waterproof adhesive 400 is filled over the vent unit 115 of the battery cells 110, propagation of the flame to the battery cells 110 adjacent to the battery cell 110 in which the abnormal situation occurs and the vent unit 115 is opened may be effectively prevented through the waterproof adhesive 400.

In the present embodiment, when the flame or the like is generated, in order to cause the flame or the like to be discharged more quickly to the outside of the battery pack 10 before propagating to the battery cells 110 adjacent to the battery cell 110 in which the abnormal situation occurs, the first case 120 may be formed of a material that is easily broken by the flame or the like. The first case 120 may be formed of a plastic material that is easily broken by the flame or the like as described above.

As such, in the battery pack 10 according to the present embodiment, because a portion surrounding the vent unit 115 of each of the battery cells 110 is filled with the waterproof adhesive 400, through the waterproof adhesive 400, the transfer of heat, gas, flame, or the like to the adjacent battery cells 110 when an abnormal situation occurs may be prevented, thereby effectively preventing the risk of chain firing.

Accordingly, through the waterproof adhesive 400, the battery pack 10 according to the present embodiment may prevent explosion or the like such as thermal runaway caused by chain firing when an abnormal situation occurs in the battery pack 10, thereby further ensuring the safety of the battery pack 10.

Figure 11:
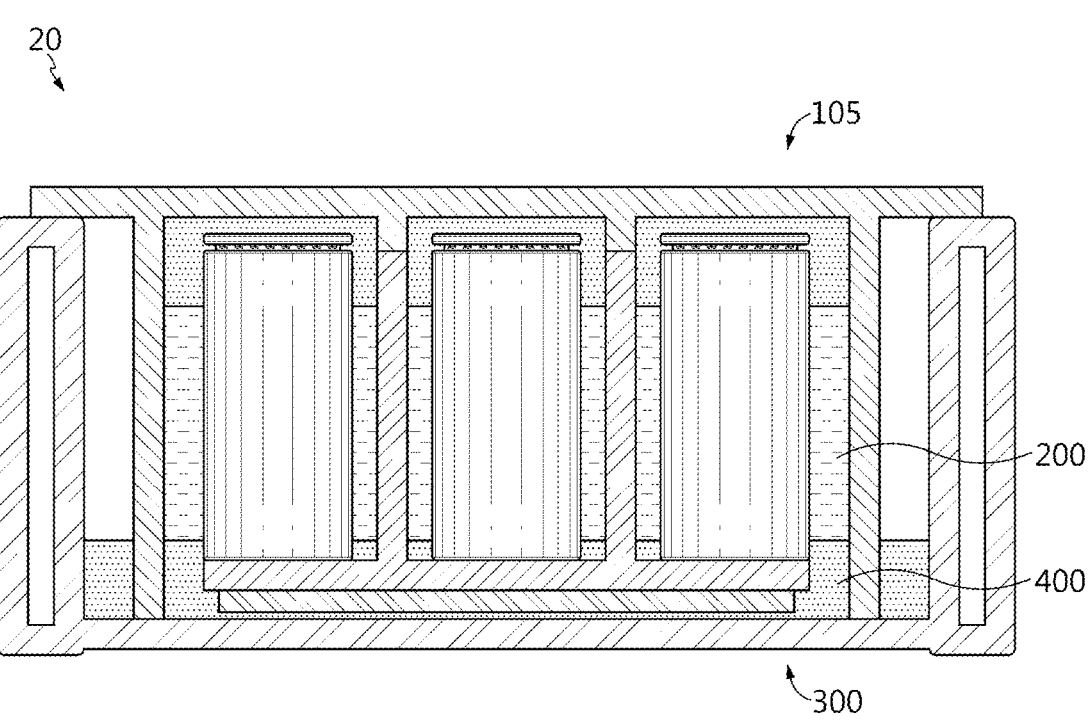
FIGS. 11 and 12 are views for describing a battery pack according to another embodiment of the present disclosure.
Figure 12:
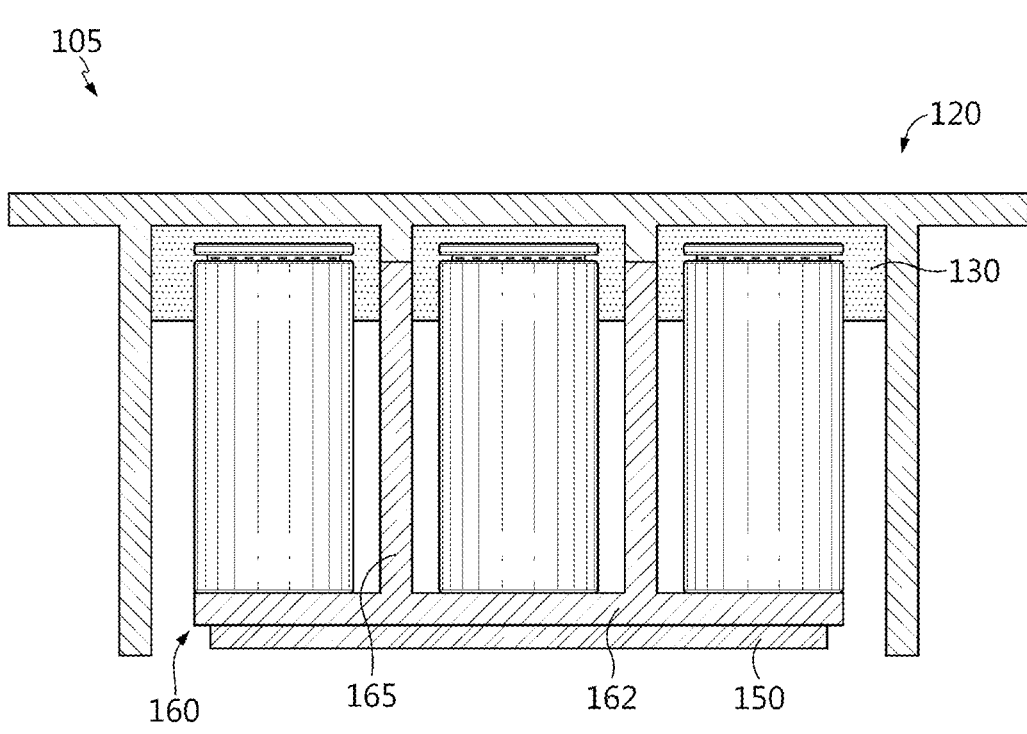

FIGS. 11 and 12 are views for describing a battery pack according to another embodiment of the present disclosure.

A battery pack 20 according to the present embodiment is similar to the battery pack of the above embodiment, and thus a repeated description of elements that are substantially the same as or similar to those in the above embodiment will be omitted and the following will focus on a difference from the above embodiment.

Referring to FIGS. 11 and 12, the battery pack 20 may include a battery cell assembly 105, the coolant 200, the pack case 300, and the waterproof adhesive 400.

The battery cell assembly 105 may include the battery cell 110, the first case 120, the cell adhesive 130, the bus bar unit 150, and a second case 160.

The battery cell 110, the first case 120, the cell adhesive 130, and the bus bar unit 150 are substantially the same as or similar to those in the above embodiment, and thus a repeated description will be omitted.

The second case 160 may include a seating frame 162 and a rigidity reinforcing rib 165.

The seating frame 162 is substantially the same as or similar to that in the above embodiment, and thus a repeated description will be omitted.

The rigidity reinforcing rib 165 may be provided in the second case 160. In detail, the rigidity reinforcing rib 165 may be formed on the seating frame 162 of the second case 160 and may extend to a certain length in a longitudinal direction of the battery cell 110 to reinforce the rigidity of the battery cell assembly 105. The rigidity reinforcing rib 165 may be provided in the first case 120, instead of the second case 160, or may be provided in both the first case 120 and the second case 160.

The rigidity reinforcing rib 165 may reinforce the rigidity of the battery cell assembly 100, may optimize a fluid passage for improving the cooling performance of the coolant 200, and may guide the optimized amount of injection of the coolant 200.

The coolant 200, the pack case 300, and the waterproof adhesive 400 are substantially the same as or similar to those in the above embodiment, and thus, a repeated description will be omitted.

As such, through the rigidity reinforcing rib 165, the battery pack 20 according to the present embodiment may reinforce the rigidity of the battery cell assembly 100 and may further improve the cooling performance of the coolant 200.

Figure 13:
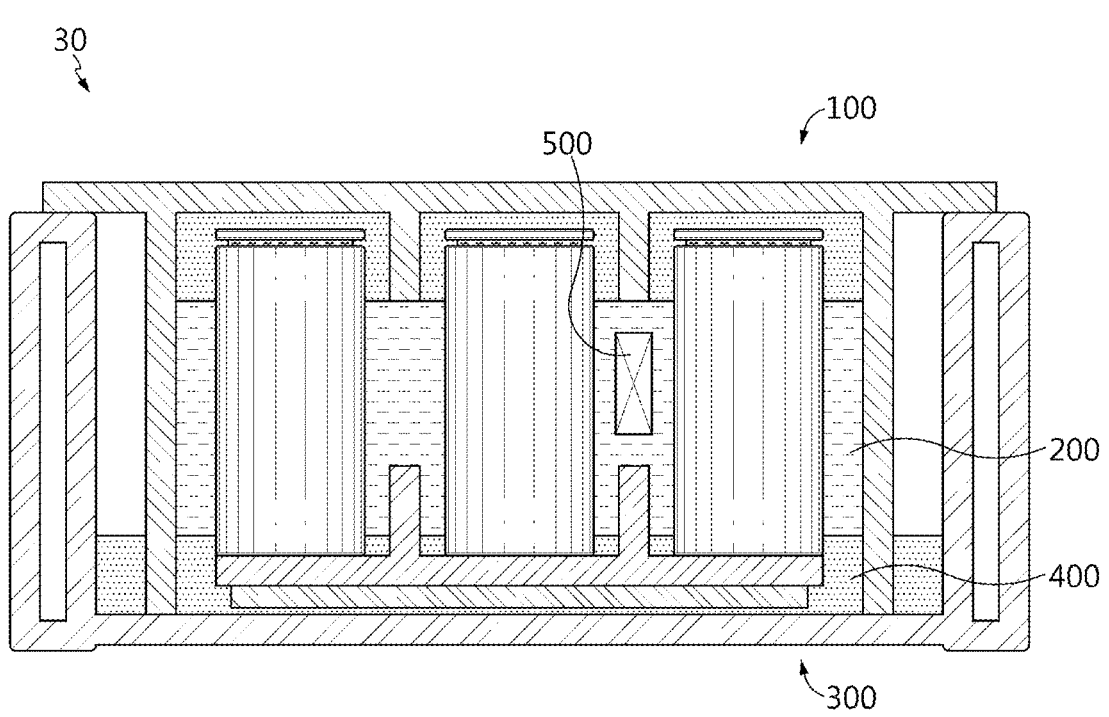
FIG. 13 is a view for describing a battery pack according to still another embodiment of the present disclosure.

FIG. 13 is a view for describing a battery pack according to still another embodiment of the present disclosure.

A battery pack 30 according to the present embodiment is similar to the battery pack 10 of the above embodiment, and thus, a repeated description of elements that are substantially the same as or similar to those in the above embodiment will be omitted and the following will focus on a difference from the above embodiment.

Referring to FIG. 13, the battery pack 30 may include the battery cell assembly 100, the coolant 200, the pack case 300, the waterproof adhesive 400, and a corrosion preventing member 500.

The battery cell assembly 100, the coolant 200, the pack case 300, and the waterproof adhesive 400 are substantially the same as or similar to those in the above embodiment, and thus, a repeated description will be omitted.

The corrosion preventing member 500 for preventing corrosion of battery cells of the battery cell assembly 100 may be provided in the pack case 300. In detail, the corrosion preventing member 500 may be provided between the battery cells of the battery cell assembly 100.

In the present embodiment, because the battery cells of the battery cell assembly 100 are provided in the coolant 200 that is cooling water, a battery can forming an outer circumferential surface of each of the battery cells may be corroded.

To prevent the problem, the corrosion preventing member 500 may include a deoxidizer reacting with oxygen dissolved in the coolant 200 that is cooling water. In addition, the corrosion preventing member 500 may be formed of a material including zinc or calcium which is more easily corroded, that is, more easily oxidized, than a general nickel-plated steel material that is a component of the battery can, in order to prevent corrosion of the battery can of the battery cell. When all of the oxygen dissolved in the cooling water reacts with the corrosion preventing member 500, corrosion does not proceed any more. Accordingly, through the corrosion preventing member 500, corrosion of the battery cells may be effectively prevented.

As such, through the corrosion preventing member 500, the battery pack 30 according to the present embodiment may effectively prevent corrosion of the battery cells of the battery cell assembly 100 located in the coolant 200.

In addition, a structure of any of the battery packs 10, 20, 30 in which a waterproof structure capable of simplifying a waterproofing process is implemented and waterproof reliability is improved may be applied to a structure of a battery module. That is, when a battery module has the above-described structure of the battery pack, likewise, a waterproof structure capable of simplifying a waterproofing process may be implemented and waterproof reliability may be improved.

Figure 14:
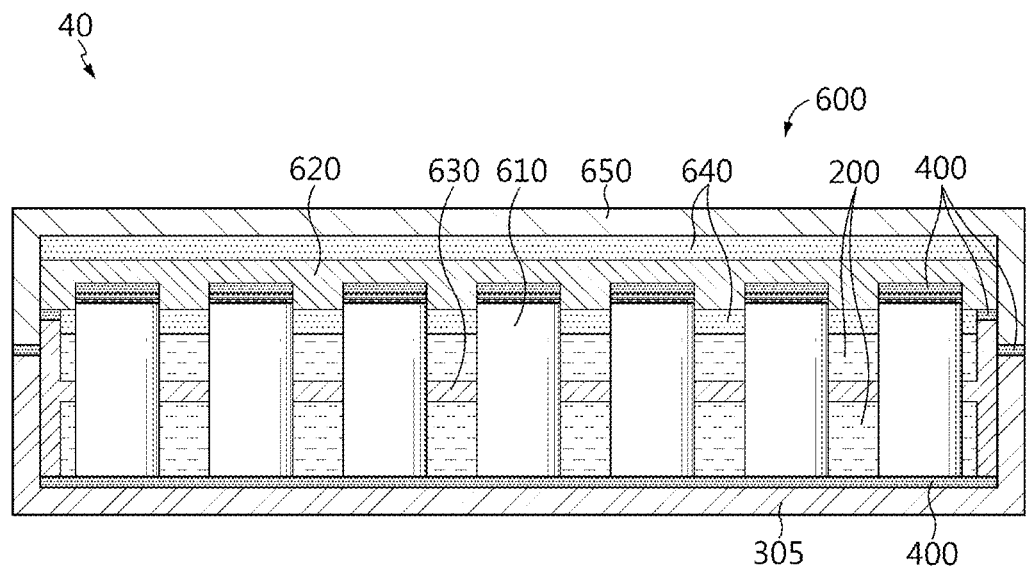
FIG. 14 is a view for describing a battery pack according to still another embodiment of the present disclosure.

FIG. 14 is a view for describing a battery pack according to still another embodiment of the present disclosure.

A battery pack 40 according to the present embodiment is similar to the battery pack 10 of the above embodiment, and thus a repeated description of elements that are substantially the same as or similar to those in the above embodiment will be omitted and the following will focus on a difference from the above embodiment.

Referring to FIG. 14, the battery pack 40 may include the coolant 200, a pack case 305, the waterproof adhesive 400, and a battery cell assembly 600.

The coolant 200, the pack case 305, and the waterproof adhesive 400 are similar to those in the above embodiment, and thus, a repeated description will be omitted.

The battery cell assembly 600 may include a plurality of battery cells 610, a cell frame 620, a middle frame 630, a cell adhesive 640, and a cover frame 650.

The plurality of battery cells 610 are substantially the same as or similar to the plurality of battery cells 110 of the above embodiment, and thus a repeated description will be omitted.

The cell frame 620 may support the plurality of battery cells 610. The cell frame 620 may include a plurality of cell grooves into which the plurality of battery cells 610 are inserted to more stably support the plurality of battery cells 610.

The middle frame 630 into which the plurality of battery cells 610 are inserted may support the plurality of battery cells 610. Through the middle frame 630, the plurality of battery cells 610 may be more stably fixed to the cell frame 620.

The middle frame 630 may be coupled to the cell frame 620. In detail, both end portions of the middle frame 630 may be coupled to both end portions of the cell frame 620.

The cell adhesive 640 may be adhered to the plurality of battery cells 610 and the cell frame 620, to further increase a fixing force of the plurality of battery cells 610.

In addition, the cell adhesive 640 may be located between the cell frame 620 and the cover frame 650 described below, to guide coupling between the cell frame 620 and the cover frame 650 described below.

The cover frame 650 may cover the plurality of battery cells 610, and may be coupled to the pack case 305. The ware proof adhesive 400 may be provided between the cover frame 650 and the pack case 305 to further strengthen coupling between the cover frame 650 and the pack case 305 and prevent penetration of a foreign material or the like or leakage of internal cooling water or the like.

Figure 15:
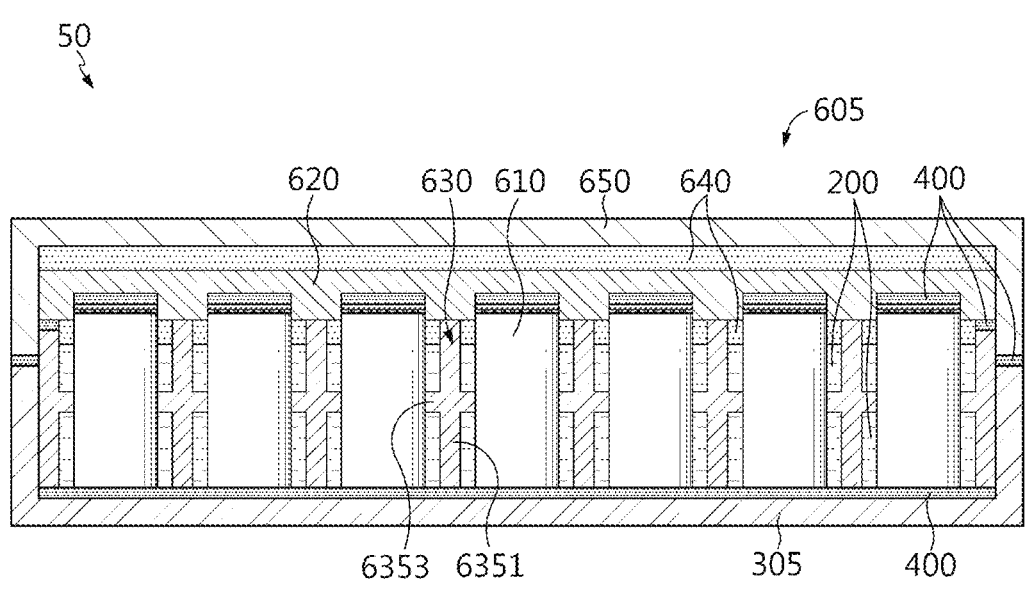
FIG. 15 is a view for describing a battery pack according to another embodiment of the present disclosure.

FIG. 15 is a view for describing a battery pack according to still another embodiment of the present disclosure.

A battery pack 50 according to the present embodiment is similar to the battery pack 10 of the above embodiment, and thus a repeated description of elements that are substantially the same as or similar to those in the above embodiment will be omitted and the following will focus on a difference from the above embodiment.

Referring to FIG. 15, the battery pack 50 may include the coolant 200, the pack case 305, the waterproof adhesive 400, and a battery cell assembly 605.

The coolant 200, the pack case 305, and the waterproof adhesive 400 are similar to those in the above embodiment, and thus, a repeated description will be omitted.

The battery cell assembly 605 may include the battery cell 610, the cell frame 620, a middle frame 635, the cell adhesive 640, and the cover frame 650.

The battery cell 610 and the cell frame 620 are similar to those in the above embodiment, and thus a repeated description will be omitted.

The middle frame 635 may include a frame body 6351 and a reinforcing rib 6353.

The plurality of battery cells may be inserted into the frame body 6351. The frame body 6351 is similar to the middle frame 630 of the above embodiment, and thus, a repeated description will be omitted.

The reinforcing rib 6353 may be provided on the frame body 6351, and may be located between the plurality of battery cells 610. The reinforcing rib 6353 may reinforce the rigidity of the frame body 6351. Through the reinforcing rib 6353, the rigidity of the middle frame 635 may be further increased.

In addition, the reinforcing rib 6353 may divide each of the plurality of battery cells 610. Accordingly, even when an abnormal situation occurs due to overheating or the like in one of the plurality of battery cells 610, propagation of heat to the battery cells 610 adjacent to the battery cell with the abnormal situation may be minimized through the reinforcing rib 6353.

The cell adhesive 640 and the cover frame 650 are similar to those in the above embodiment, and thus a repeated description will be omitted.

Figure 16:
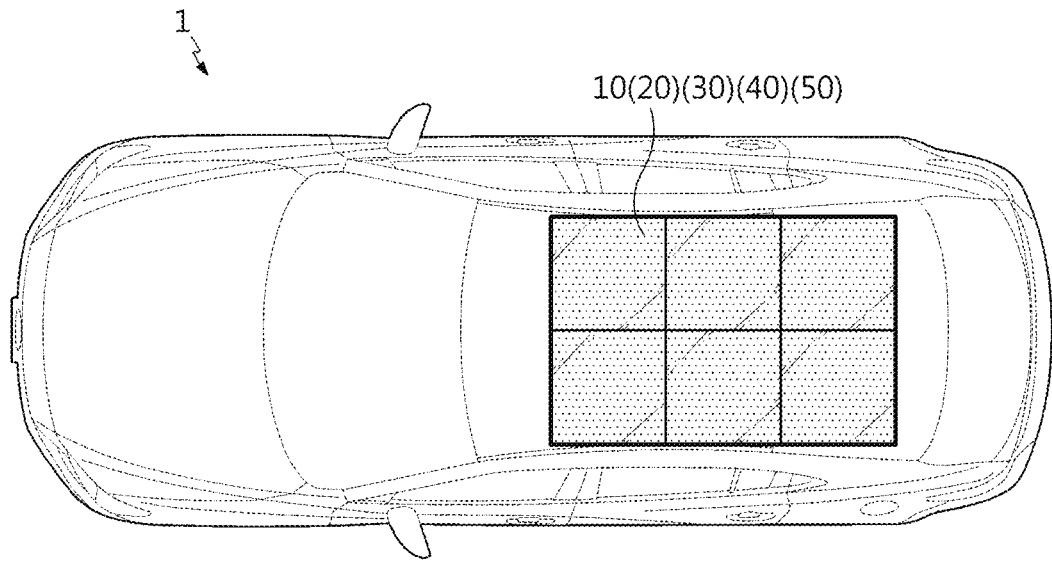
FIG. 16 is a view for describing a vehicle according to an embodiment of the present disclosure.

FIG. 16 is a view for describing a vehicle according to an embodiment of the present disclosure.

Referring to FIG. 16, a vehicle 1 that is an electric vehicle or a hybrid vehicle may include at least one of the battery packs 10, 20, 30, 40, 50 of the above embodiments as an energy source. Because the vehicle 1 according to the present embodiment includes any of the battery packs 10, 20, 30, 40, 50, the vehicle 1 may have all of the advantages of any of the battery packs 10, 20, 30, 40, 50.

According to the above various embodiments, the battery packs 10, 20, 30, 40, 50 in which a waterproof structure capable of simplifying a waterproofing process is implemented and waterproof reliability is improved and the vehicle 1 including any of the battery packs 10, 20, 30, 40, 50 may be provided.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A battery pack, comprising:
a battery cell assembly comprising a plurality of battery cells;
a coolant filled between the plurality of battery cells of the battery cell assembly;
a pack case in which the coolant and the battery cell assembly are accommodated;
a waterproof adhesive provided in the pack case to a certain height and at least partially covering a lower end portion of the battery cell assembly;
a bus bar unit electrically connected to the plurality of battery cells; and
a seating frame supporting lower ends of the plurality of battery cells,
wherein:
the seating frame is different from the bus bar unit and extends continuously along the lower ends of the plurality of battery cells in a horizontal direction; and
lower portions of the plurality of battery cells, the seating frame, and the bus bar unit are submerged in the waterproof adhesive.

2. The battery pack according to claim 1, wherein the battery cell assembly comprises:
a first case supporting a side of each of the plurality of battery cells;
a cell adhesive provided in the first case and fixing a side of each of the plurality of battery cells;
a second case spaced apart by a certain distance from the cell adhesive and supporting the other side of each of the plurality of battery cells; and
the bus bar unit provided at the second case and electrically connected to the plurality of battery cells, and
wherein the second case comprises the seating frame.

3. The battery pack according to claim 2, wherein the coolant is filled between the plurality of battery cells in the first case.

4. The battery pack according to claim 2, wherein the first case comprises:
a cover frame covering a side of each of the plurality of battery cells;
a pair of main supports extending from the cover frame and provided on both outermost sides of the plurality of battery cells; and
at least one cell dividing portion provided between the pair of main supports and dividing each of the plurality of battery cells.

5. The battery pack according to claim 4, wherein the cell adhesive is filled between the pair of main supports and the at least one cell dividing portion.

6. The battery pack according to claim 2, wherein the battery cell assembly further comprises at least one rigidity reinforcing rib provided in the first case or the second case and extending to a certain length to reinforce rigidity of the battery cell assembly.

7. The battery pack according to claim 2, wherein each of the first case and the second case is formed of a plastic material.

8. The battery pack according to claim 1, wherein the pack case comprises:
a base case supporting the battery cell assembly; and
a cross beam provided on both sides of the base case and coupled to an upper end portion of the battery cell assembly.

9. The battery pack according to claim 8, wherein the waterproof adhesive is filled to a certain height on an inner surface of the base case.

10. The battery pack according to claim 1, further comprising a corrosion preventing member provided in the pack case to prevent corrosion of the plurality of battery cells of the battery cell assembly.

11. The battery pack according to claim 10, wherein the corrosion preventing member comprises a deoxidizer reacting with oxygen dissolved in the coolant.

12. The battery pack according to claim 1, wherein the battery cell assembly further comprises a middle frame into which the plurality of battery cells are inserted and that is provided to support the plurality of battery cells.

13. The battery pack according to claim 12, wherein the middle frame comprises:
a frame body into which the plurality of battery cells are inserted; and
a reinforcing rib provided on the frame body and located between the plurality of battery cells.

14. A vehicle comprising the battery pack according to claim 1.

15. The battery pack according to claim 1, wherein:
the seating frame is located between the plurality of battery cells and the bus bar unit; and
the seating frame is different from the pack case and different from the bus bar unit.

16. The battery pack according to claim 1, wherein:
the seating frame extends continuously along the horizontal direction from one battery cell located at one end to another battery cell located at another end; and
the plurality of battery cells comprise the one battery cell and the another battery cell.

17. The battery pack according to claim 1, wherein:
all of the plurality of battery cells comprise more than two battery cells;
the bus bar unit extends along the horizontal direction; and
the seating frame is electrically nonconductive.

18. A battery pack, comprising:
a battery cell assembly comprising a plurality of battery cells;
a coolant filled between the plurality of battery cells of the battery cell assembly;
a pack case in which the coolant and the battery cell assembly are accommodated; and
a waterproof adhesive provided in the pack case to a certain height and at least partially covering a lower end portion of the battery cell assembly,
wherein each of the plurality of battery cells comprises:
an uppermost surface;
a side surface; and
a vent unit located below the uppermost surface and having an opening at the side surface, wherein the battery cell assembly further comprises:

a cover frame disposed above the uppermost surfaces of the plurality of battery cells; and a cell adhesive, wherein at least parts of the cell adhesive are disposed between the cover frame and the uppermost surfaces of the plurality of battery cells, and wherein some parts of the cell adhesive surround the openings of the vent units at the side surfaces.

19. The battery pack according to claim 18, wherein:

the at least parts of the cell adhesive entirely fill gaps between the cover frame and the uppermost surfaces of the plurality of battery cells;

each of the uppermost surfaces of the plurality of battery cells spans at least an upper central region of a corresponding battery cell; and the at least parts of the cell adhesive cover the uppermost surfaces of the plurality of battery cells and cover the upper central regions of the plurality of battery cells.

20. The battery pack according to claim 18, wherein the battery pack further comprises:

a bus bar unit electrically connected to the plurality of battery cells; and a seating frame, and wherein:

the seating frame is different from the bus bar unit;

the seating frame extends continuously along lower ends of the plurality of battery cells in a horizontal direction; and the seating frame and the bus bar unit are submerged in the waterproof adhesive.

\*　\*　\*　\*　\*